United States Patent
Arya et al.

(10) Patent No.: US 9,946,799 B2
(45) Date of Patent: Apr. 17, 2018

(54) FEDERATED SEARCH PAGE CONSTRUCTION BASED ON MACHINE LEARNING

(71) Applicant: Microsoft Technology Licensing, LLC, Redmond, WA (US)

(72) Inventors: Dhruv Arya, Sunnyvale, CA (US); Viet Thuc Ha, Milpitas, CA (US); Shakti Dhirendraji Sinha, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 301 days.

(21) Appl. No.: 14/753,742

(22) Filed: Jun. 29, 2015

(65) Prior Publication Data

US 2016/0321367 A1 Nov. 3, 2016

Related U.S. Application Data

(60) Provisional application No. 62/155,036, filed on Apr. 30, 2015.

(51) Int. Cl.
G06F 17/30 (2006.01)
(52) U.S. Cl.
CPC ............... G06F 17/30867 (2013.01)
(58) Field of Classification Search
CPC ................................. G06F 17/30867
USPC ........................................ 707/708
See application file for complete search history.

(56) References Cited

U.S. PATENT DOCUMENTS

| | | | |
|---|---|---|---|
| 9,183,310 B2 * | 11/2015 | Li | G06F 17/30867 |
| 9,213,749 B1 * | 12/2015 | Collins | G06F 17/30554 |
| 9,335,883 B2 * | 5/2016 | Berntson | G06F 3/048 |
| 2009/0265631 A1 * | 10/2009 | Sigurbjornsson | G06Q 10/10 715/716 |
| 2010/0023502 A1 * | 1/2010 | Marlow | G06F 17/30864 707/E17.017 |

(Continued)

OTHER PUBLICATIONS

Arguello, Jaime, et al., "Integrating and Ranking Aggregated Content on the Web", The Theory and Practice of Aggregated Search and Whole-Page Composition, (2012), 2 pgs.

(Continued)

*Primary Examiner* — Kris E Mackes
*Assistant Examiner* — Thuy T Bui
(74) *Attorney, Agent, or Firm* — Schwegman Lundberg & Woessner, P.A.

(57) ABSTRACT

Apparatuses, computer readable medium, and methods are disclosed for federated search page construction based on machine learning. The method may include receiving a search query submitted by a searcher and submitting the search query to a plurality of sources of information to generate a plurality of search results. The method may further include ranking the plurality of search results based on historical search data and selecting a primary search result and a secondary search result of the plurality of search results based on the ranking. The method may further include constructing a federated search results page with a first portion of the first search results positioned first, a cluster of the second search result positioned second, and a second portion of the first search results positioned third. The method may include causing the federated search results page to be displayed to the searcher.

15 Claims, 6 Drawing Sheets

(56) References Cited

U.S. PATENT DOCUMENTS

| | | | |
|---|---|---|---|
| 2011/0191363 A1* | 8/2011 | Bell | G06F 17/21 |
| | | | 707/767 |
| 2011/0282867 A1* | 11/2011 | Palermiti, II | G06K 9/6253 |
| | | | 707/722 |
| 2012/0005148 A1* | 1/2012 | Horvitz | G06N 5/043 |
| | | | 706/50 |
| 2012/0158685 A1* | 6/2012 | White | G06F 17/30867 |
| | | | 707/706 |
| 2014/0059042 A1* | 2/2014 | Vinay | G06F 17/30864 |
| | | | 707/723 |

OTHER PUBLICATIONS

Kumar, Ashok, "On Composition of Federated Web Search Result Page: Using Online Users to Provide Pairwise Preference for Heterogenous Verticals", WSDM'11, (Feb. 2011), 10 pgs.

* cited by examiner

FEDERATED SEARCH PAGE CONSTRUCTION BASED ON MACHINE LEARNING

CROSS-REFERENCE TO RELATED APPLICATIONS

This application claims the benefit of U.S. Provisional Application No. 62/155,036, filed Apr. 30, 2015, entitled "FEDERATED SEARCH PAGE CONSTRUCTION BASED ON MACHINE LEARNING," which is incorporated herein by reference in its entirety.

TECHNICAL FIELD

Embodiments pertain to searching. Some embodiments relate to searching different sources of information and constructing a federated search page of results from the results of the different searches. Some embodiments relate to query processing to improve federated search page construction. Some embodiments relate to using machine learning to improve federated search page construction.

BACKGROUND

Searching has become one of the most used features on computers. Users use search to satisfy a need for information. Users express the need for information with a search query. The information the user is searching for may be to find people, job openings, company information, directions, product information, advice, groups, a date, and pretty much anything that a user may want to find information about.

DESCRIPTION OF THE DRAWINGS

Some embodiments are illustrated by way of example and not limitation in the FIGS. of the accompanying drawings, in which.

DETAILED DESCRIPTION

The present disclosure describes methods, systems and computer program products for improving the rankings of search results corresponding to a search query. In the following description, for purposes of explanation, numerous specific details are set forth in order to provide a thorough understanding of the various aspects of different embodiments of the present invention. It will be evident, however, to one skilled in the art, that the present invention may be practiced without all of the specific details and/or with variations permutations and combinations of the various features and elements described herein.

A search query often results in many irrelevant results and may waste the time of the searcher or frustrate the searcher. Moreover, the amount of information available continues to grow, which may mean even more information may be presented to the searcher that is not relevant to the information the searcher wants.

Displaying the more relevant search results near the top of the search results may save the user time, but it may be difficult to determine which results are more relevant to the user. Moreover, presenting fewer search results may save the user time, but it may be difficult to determine which results are more relevant to the user. Additionally, there may be many sources of information from which the search query may be submitted, and only displaying search results from some sources of information may save the user time, but it may be difficult to determine which source of information are more relevant.

A system has been developed that receives a search query submitted by a searcher and submits the search query to multiple sources of information to generate multiple search results. The system then ranks the multiple search results based on historical search data. The system may then select primary search results and second search results of the multiple search results based on the ranking. The system may then construct a federated search results page with a first portion of the primary search results positioned first, a cluster of the second search results positioned second, and a second portion of the first search results positioned third. The system may then cause the federated search results page to be displayed to the searcher.

Figure 1:
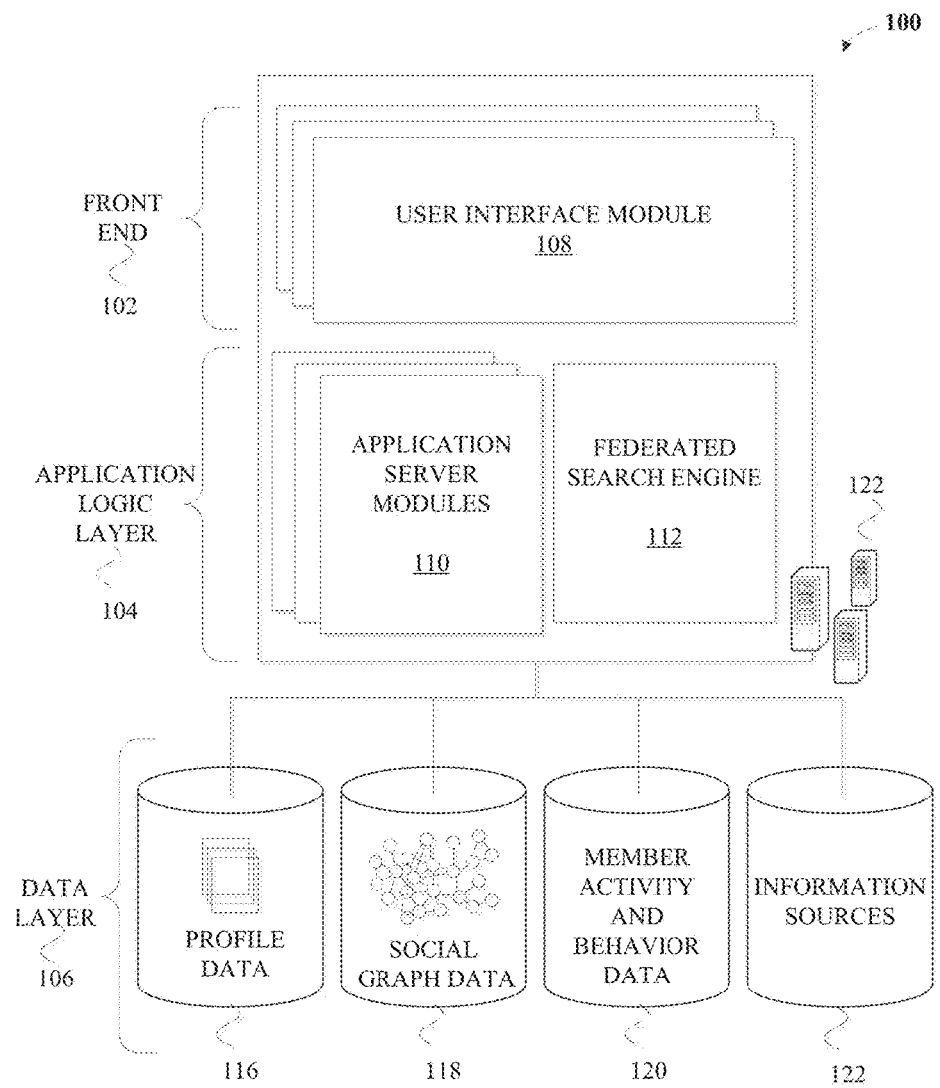
FIG. 1 is a block diagram of the functional modules or components that comprise a computer-network based social network service, including a search engine consistent with some embodiments of the invention.

FIG. 1 is a block diagram of a social network system 100 in accordance with some embodiments. The social network system 100 may be based on a three-tiered architecture, comprising a front-end layer 102, application logic layer 104, and data layer 106. Some embodiments implement the social network system 100 using different architectures. The social network system 100 may be implemented on one or more computers 122. The computers 122 may be servers, personal computers, laptops, portable devices, etc. The social network system 100 may be implemented in a combination of software, hardware, and firmware.

As shown in FIG. 1, the front end 102 includes a user interface modules 108. The user interface module 108 may be a web service. The user interface module receives requests from various client-computing devices, and communicates appropriate responses to the requesting client devices. For example, the user interface module 108 may receive requests in the form of Hypertext Transport Protocol (HTTP) requests, or other web-based, application programming interface (API) requests. The client devices (not shown) may be executing conventional web browser applications, or applications that have been developed for a specific platform to include any of a wide variety of mobile devices and operating systems.

As shown in FIG. 1, the data layer 106 includes profile data 116, social graph data 118, member activity and behaviour data 120, and information sources 122. Profile data 116, social graph data 118, and member activity and behaviour data 120, and/or information sources 122 may be databases. One or more of the data layer 106 may store data relating to various entities represented in a social graph. In some embodiments, these entities include members, companies, and/or educational institutions, among possible others. Consistent with some embodiments, when a person initially registers to become a member of the social network system 100, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored as part of a member's member profile, for example, in profile data 116. With some embodiments, a member's profile data will include not only the explicitly provided data, but also any number of derived or computed member profile attributes and/or characteristic, which may become part of one of more of profile data 116, social graph data 118, member activity and behaviour data 120, and/or information sources 122.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the social graph data 118. With some embodiments the social graph data 118 may be implemented with a graph database, which is a particular type of database that uses graph structures with nodes, edges, and properties to represent and store data. In this case, the social graph data 118 reflects the various entities that are part of the social graph, as well as how those entities are related with one another.

With various alternative embodiments, any number of other entities might be included in the social graph data 118, and as such, various other databases may be used to store data corresponding with other entities. For example, although not shown in FIG. 1, consistent with some embodiments, the system may include additional databases for storing information relating to a wide variety of entities, such as information concerning various online or offline (see FIG. 2) people 250.1, jobs 250.2, companies 250.3, groups 250.4, posts 250.5, slideshares 250.6, and so forth.

With some embodiments, the social network service may include one or more activity and/or event tracking modules, which generally detect various user-related activities and/or events, and then store information relating to those activities/events in, for example, member activity and behaviour data 120. For example, the tracking modules may identify when a user makes a change to some attribute of his or her member profile, or adds a new attribute. Additionally, a tracking module may detect the interactions that a member has with different types of content. Such information may be used, for example, by one or more recommendation engines to tailor the content presented to a particular member, and generally to tailor the user experience for a particular member.

Information sources 122 may be one or more additional information sources. For example, information sources 122 may include (see FIG. 2) ranking and business rules 252.1, historical search data 252.2, and reference data 252.3, as well as people 250.1, jobs 250.2, etc.

The application logic layer 104 includes various application server modules 110, which, in conjunction with the user interface module 108, generates various user interfaces (e.g., web pages) with data retrieved from the data layer 106. In some embodiments, individual application server modules 110 are used to implement the functionality associated with various applications, services and features of the social network service. For instance, a messaging application, such as an email application, an instant messaging application, or some hybrid or variation of the two, may be implemented with one or more application server modules 110. Of course, other applications or services may be separately embodied in their own application server modules 110. In some embodiments applications may be implemented with a combination of application service modules 110 and user interface modules 108. For example, a federated search engine 112 may be implemented with a combination of back-end modules, front-end modules, and modules that reside on a user's computer 122. For example, the social network system 100 may download a module to a web browser running on a user's computer 122, which may communicate with a module running on a server 122 which may communicate with a module running on a back-end database server 122.

The social network system 100 may provide a broad range of applications and services that allow members the opportunity to share and receive information, often customized to the interests of the member. For example, with some embodiments, the social network system 100 may include a photo sharing application that allows members to upload and share photos with other members. As such, at least with some embodiments, a photograph may be a property or entity included within a social graph. With some embodiments, members of a social network service may be able to self-organize into groups, or interest groups, organized around a subject matter or topic of interest. Accordingly, the data for a group may be stored in groups 250.4 (FIG. 2), which may be a database. When a member joins a group, his or her membership in the group may be reflected in the social graph data 118. In some embodiments, members may subscribe to or join groups affiliated with one or more companies. For instance, with some embodiments, members of the social network service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modelled with the social graph data 118.

In addition to the various application server modules 110, the application logic layer includes a federated search engine 112. As illustrated in FIG. 1, with some embodiments the federated search engine 112 is implemented as a service that operates in conjunction with various application server modules 110 and user interface modules 108. For instance, any number of individual application server modules 110 can invoke the functionality of the federated search engine 112. However, with various alternative embodiments, the federated search engine 112 may be implemented as its own application server module 110 such that it operates as a standalone application.

Figure 3:
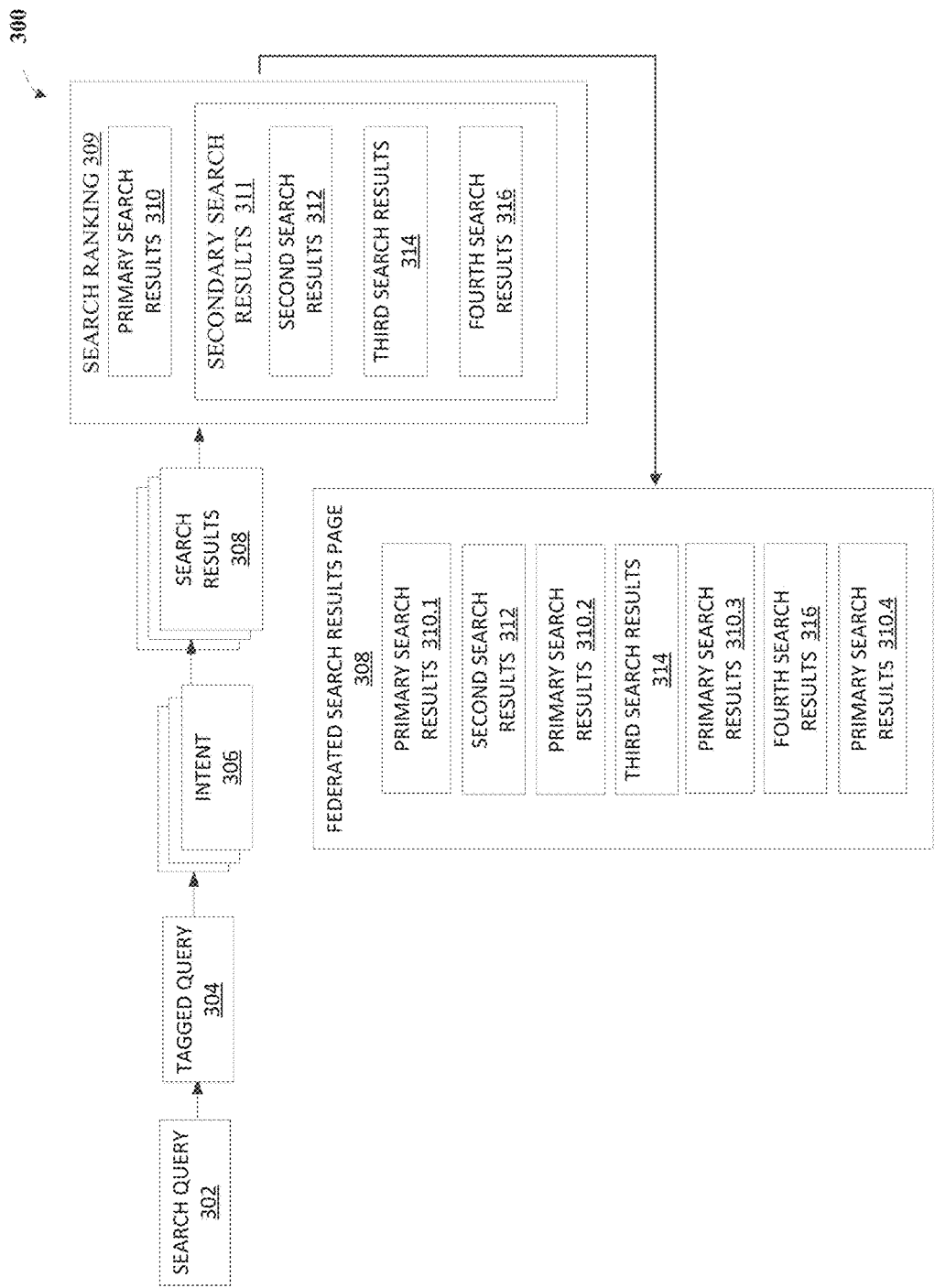
FIG. 3 illustrates a data flow for federated search page construction in accordance with some embodiments.

The federated search engine 112 may search the data layer 106 and determine how to present the results of the search in a federated search results page 308 (see FIG. 3). For example, the federated search engine module 112 may facilitate searching for any type of information entity (e.g., people 250.1, jobs 250.2, companies 250.3, groups 250.4, posts 250.5, slideshare 250.6, etc.) that is maintained and used by the various applications of the social network system 100 and generate a federated search results page 308.

With some embodiments, the federated search engine 112 may include or have an associated publicly available application programming interface (API) that enables third-party applications to invoke the functionality of the federated search engine 112. With some embodiments, the federated search engine 112 may include features that enable a search to be directed to specific information sources 122 such as a people 250.1, and provide functionality to search for only people 250.1 (e.g., member profiles) specifically.

As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the disclosed embodiments with unnecessary detail, various functional modules and engines that are not germane to conveying an understanding of the inventive subject matter have been omitted from FIG. 1. However, a skilled artisan will readily recognize that various additional functional modules and engines may be used with a social network system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the disclosed embodiments are by no means limited to such architecture.

Figure 2:
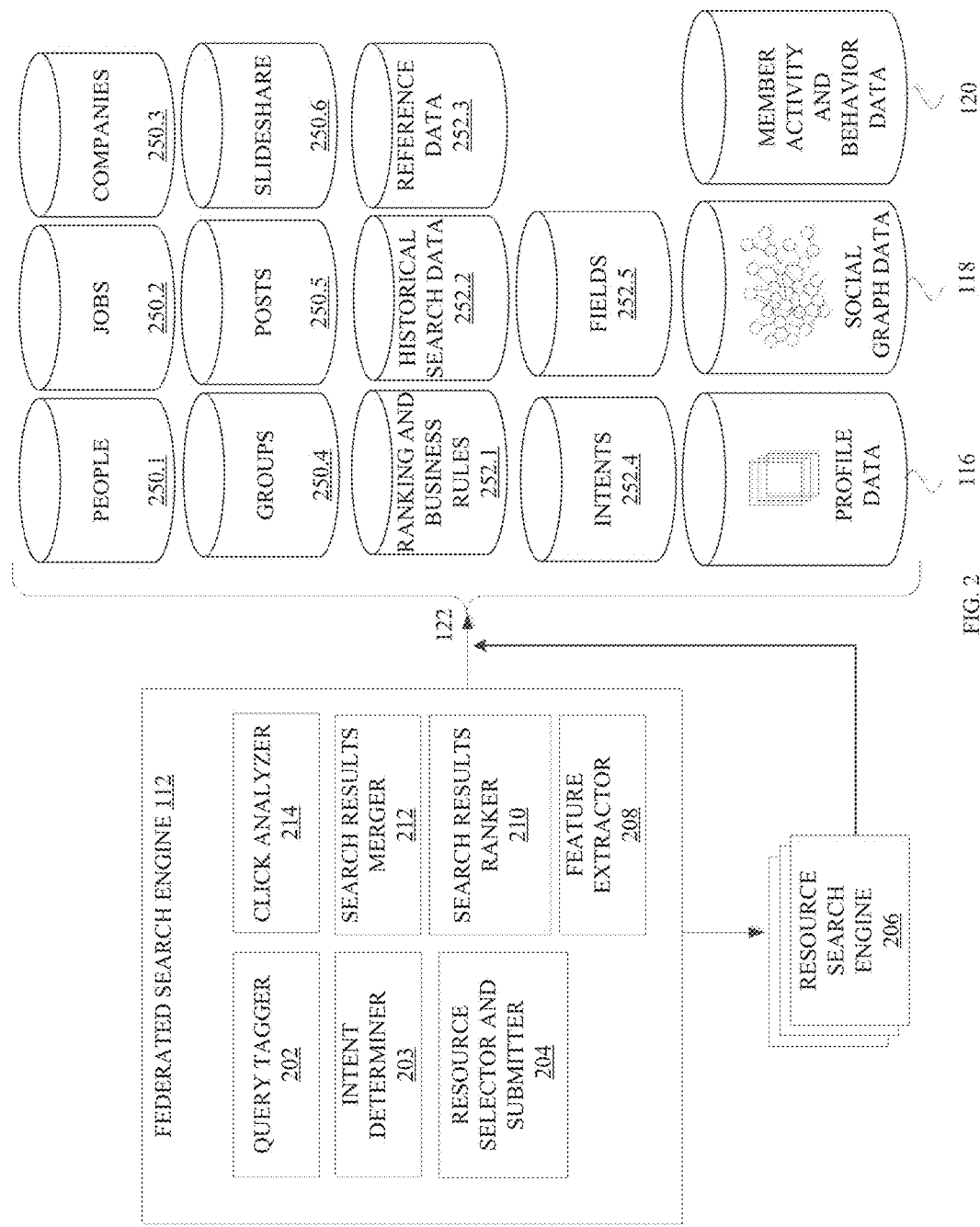
FIG. 2 illustrates a system for federated search page construction in accordance with some embodiments.

FIG. 2 illustrates a system for federated search page construction in accordance with some embodiments. Illustrated in FIG. 2 are a federated search engine 112, resource search engines 206, and information sources 122. The information sources 122 may include profile data 116, social graph data 118, membership activity and behaviour data 120, people 250.1, jobs 250.2, companies 250.3, groups 250.4, posts 250.5, slideshare 250.6, ranking and business rules 252.1, historical search data 252.2, reference data 252.3, intents 252.4, and fields 252.5. One skilled in the art would recognize that other information sources 122 may be included in a federated search.

The federated search engine 112 may include a query tagger 202, intent determiner 203, resource selector and submitter 204, feature extractor 208, search results ranker 210, search results merger 212, and click analyser 214. FIG. 3 illustrates a data flow 300 for federated search page construction in accordance with some embodiments. FIGS. 2 and 3 will be described in conjunction with one another. Resource search engines 206 may be separate search engines associated with the information sources 122. The federated search engine 112 may either perform the search of an information source 122 or submit a search query to a separate resource search engine 206.

The query tagger 202 may be configured to receive a search query 302 and identify the semantic units in the search query 302. For example, if a search query 302 is "Dan LinkedIn", then the query tagger 202 may determine that "Dan" is a first name, and that "LinkedIn" is a company name. The query tagger 202 may then rewrite the search query 302 to a tagged query 304 as "fn:Dan cn:LinkedIn" assuming that the field name for first name is "fn" and the field name for company is "cn." The field names may come from the information sources 122 such as fields 252.5. Fields 252.5 may be a database of field names that are used with the different information sources 122 and may associate the field names with the information sources 122. For example, fields 252.5 may include an association of "fn" with people 250.1 as well as all the other fields that are used in the people 250.1 information source 122. In some embodiments fields 252.5 may include all the values for the field names that are used in information sources 122 as well as other possible values for the fields.

In some embodiments the query tagger 202 may generate different tagged queries 304 for different information sources 122 if the field names used in the different information sources 122 are different. The query tagger 202 may identify one or more information sources 122 for the tagged query 304 to be submitted to. In some embodiments the semantic units may be longer than one word. In some embodiments the query tagger 202 uses meta-data for fields such as "type(first name, last name)", and determines a maximum likelihood that the fields will be used. For non-ambiguous entries, the query tagger 202 may be configured to use a lexical match to identify a field name. To disambiguate lexical entries with multiple entries, the query tagger 202 is configured to use a machine learning algorithm that trains using search query logs. For example, a Viterbi machine learning method may be used to determine the most likely assignment of tags to the query segments. In some embodiments, the search query 302 is segmented using a left-to-right, longest match first greedy approach. In some embodiments, point-wise mutual information is used to match the search query 302 to tags. In some embodiments a combination of point-wise mutual information and a greedy approach is used.

In some embodiments reference data 252.3 may be used to determine the tagged query 304. For example, a query "Dell" may generate the tagged query 304 "(first_name:dell, company_name: dell)". The reference data 252.3 may include names of companies from external sources such as a stock market or the Internal Revenue Service that the query tagger 202 may use to determine that "dell" is the name of a company, or may be the name of a company.

The intent determiner 203 may determine one or more intents 306 of the search query 302. The intent 306 may be based on historical search data 252.2 and/or intents 252.4, which may include aggregate data and/or data that is particular to the user that submitted the search query 302. An example intent 306 includes a "recruiting intent," with an indication to search people 250.1. Another example intent 306 includes a "job seeker intent" with an indication to search jobs 250.2. The intent 306 may be determined based on the tagged query 304 as well as historical search data 252.2. For example, a tagged query 304 may include a job title such as "jt:software engineer" and historical search data 252.2 may indicate that searchers whose search query 302 includes a job title are frequently job seekers whose search can best be satisfied by showing results from the jobs 250.2 information source 122. The intents 252.4 information source 122 may be a database of intents that includes rules for determining intents and information sources 122 to search for intents as well as fields that may be likely to occur for a particular intent.

The intent determiner 203 may use information from other information sources 122 to determine one or more intents 306. For example, the intent determiner 203 may examine the profile data 116 of the searcher and determine that the searcher recently lost a job or graduated from college so they are more likely to have an intent of "job seeker intent." For example, the intent determiner 203 may determine that there is no current job attribute and a previous job attribute indicates a recent end date, or that the education attribute in their member profile indicates a graduation date.

As another example, the intent determiner 203 may examine the member activity and behaviour data 120 and determine that the behaviour indicates that the searcher may be a recruiter. For example the searcher may be a member of a group for recruiters.

The resource selector and submitter 204 may be configured to select information resources 122 and submit the tagged query 304 to the information resources 122. In some embodiments the resource selector and submitter 204 selects all the information resources 122 to submit the tagged query 304 to. The resource selector and submitter 204 may perform the search itself or submit the tagged query 304 to a resource search engine 206. The resource search engines 206 may include general Internet search engines such as Google®. In some embodiments all information sources 122 may be queried if the tagged query 304 does not contain any fields that were identified as names. In some embodiments all information sources 122 may be queried if the tagged query 304 does not contain any fields that were identified as names and the tagged query 304 only contains entities such as skills, locations, companies, and titles.

The feature extractor 208 may extract features from the search results 308 for the search results ranker 210. The features may include one or more of inferred intent based features, result relevance features, primary result type features, and secondary result type features. The inferred intent based features may include, for example, an intent and a result type (e.g., a recruiting intent and a result type of people, or a job seeking intent and a result type of job). Primary result type features and secondary result type features may include, for example, an information source 122 and a result type (e.g., people is the primary information source 122 and the result type is people), and information source 122 click rates from past searches.

The search results ranker 210 may rank the search results 308 and determine a search ranking 309, which may include primary search results 310 and secondary search results 311. The secondary search results 311 may include a second search results 312, third search results 314, and fourth search results 316. The search results ranker 210 may rank the search results 308 based on ranking and business rules 252.1, historical search data 252.2, the tagged query 304, and/or the intents 306. The search results ranker 210 may rank the search results 308 based on the extracted features. The extracted features may be treated like an n-dimensional space and a distance to previous search results may be determined. For example, the distance from previous searches may be computed along with which information source 122 was selected as the primary search results 310. And an information source 122 may then be selected as the primary search results 310 based on how often the searcher clicked on a result from the primary search results 310 from previous searches. As another illustration, the search results ranker 210 may select an information source that is further away from the search query 302 if there is a higher likelihood of the searcher clicking on the information source 122. Machine learning methods may be used to determine which of the extracted features are more important for determining whether a searcher will click on an information source 122 selected as primary search results 310 or as one of the secondary search results 311.

In some embodiments additional information sources 122 may be used. The ranking and business rules 252.1 may include rules that determine a ranking of the search results 308. The primary search results 310 are the search results 308 that the search results ranker 210 ranks as the highest search results 308. Table 1 illustrates some example ranking and business rules 252.1.

For example, as illustrated in Table 1, hero results should be the primary search results 310. A hero result may be when there appears to be a direct match between the tagged query 304 and the search results 308. For example, if a search query 302 is "Stanford University" and the search results 308 include a result for a school page of "Stanford University," then this is a hero result and should be the primary search results 310. The hero results may be considered just the highest ranking search results 308.

TABLE 1

Example Ranking and Business Rules

Hero results should be the primary search results 310.
If there are not hero results, then the primary search results 310 should be the primary search results 310.
Secondary search results, e.g., second search results 312, third search results 314, and fourth search results 316, can only appear starting from a third position on the Federated Search Results Page 308 relative to the primary search results 310.
Two secondary search results cannot appear next to each other on the Federated Search Results Page 308.
Primary search results 310 are always presented on the Federated Search Results Page 308 and individual items within the primary search results 310 will maintain their order.
Secondary results will be displayed as clusters with the information source name (e.g., People) as a header and the top three results from the information source. The top three results may appear in an abbreviated form.

Another ranking and business rule 252.1 may be whether or not the tagged query 304 was matched in the information source 122 for the fields that were tagged. For example, if it was inferred that the searcher had "job seeker intent" so that the jobs 250.2 information source 122 was searched, then a higher rank may be achieved if, for example, a field name for a job title of the tagged query 304 matched a job title in the jobs 250.2 information source 122.

In some embodiments the search results ranker 210 may rank the search results 308 based on a lowest probability of skip. In some embodiments the search results ranker 210 may rank the search results 308 for the primary search results 310 based on a first method and use a second method to select the second search results 312, third search results 314, and the fourth search results 316. In some embodiments the search results ranker 210 may place a new information source 122 as a secondary search results 311 in order to build information for the new information source 122 in the historical search data 252.2.

In some embodiments the search results ranker 210 may select the primary search results 310 from the search results 308 based on historical search data 252.2. For example, the search results ranker 210 may rank the search results 310 based on previous clicks for the same or similar search queries 302 and/or tagged queries 304. As an example, the search results ranker 210 may determine that the searcher has previously submitted the same search query 302 and thus may make the information source 122 clicked on by the searcher in the previous search as the primary search results 310.

In some embodiments the search results ranker 210 may rank the search query 302 and/or tagged query 304 based on the extracted features, which may include one or more of inferred intent based features, result relevance, primary result type features, and secondary result type features.

The search results merger 212 may generate the federated search results page 308 from the search rankings 309. The search results merger 212 may generate the federated search results page 308 in accordance with the ranking and business rules 252.1. The search results and merger 212 may position a first portion of the primary search results 310.1 at the top of the federated search results page 308. The search results merger 212 may include a header that includes a number of search results and the name of the information source 212. The search results merger 212 may then place the second search results 312 on the federated search page. The search results merger 212 may include only some of the results of the second search results 312. For example, the search results merger 212 may only include the top three search results for the second search results 312. The search results merger 212 may include a header for the second search results 312 that may include a name of the information source 212 and a number of search results of the second search results 312. The search results merger 212 may abbreviate the search result entries of the second search results 312 in comparison to the primary search results 310.1. The search results merger 212 may include a link that if selected by the searcher will show the second search results 312 in a more full form.

The search results merger 212 may place additional primary search results 310.2 after the second search results 312. In some embodiments there may be at least two entries from the additional primary search results 310.2.

In some embodiments the search results merger 212 will only display the primary search results and one of the search results from the secondary search results 311.

The search results merger 212 may place the third search results 314 on the federated search page. The search results merger 212 may include only some of the results of the third search results 314. For example, the search results merger 212 may only include the top three search results for the third search results 314. The search results merger 212 may include a header for the third search results 314 that may include a name of the information source 212 and a number of search results of the third search results 314. The search results merger 212 may abbreviate the search result entries of the third search results 314 in comparison to the primary search results 310.1. The search results merger 212 may include a link that if selected by the searcher will show the third search results 314 in a more full form.

In some embodiments the search results merger 212 will only display the primary search results and two of the search results from the secondary search results 311. The search results merger 212 may place additional primary search results 310.3 after the second search results 312. In embodiments there may be at least two entries from the additional primary search results 310.3.

The search results merger 212 may then place the fourth search results 316 on the federated search page. The search results merger 212 may include only some of the results of the fourth search results 316. For example, the search results merger 212 may only include the top three search results for the second search results 312. The search results merger 212 may include a header for the fourth search results 316 that may include a name of the information source 212 and a number of search results of the fourth search results 316. The search results merger 212 may abbreviate the search result entries of the fourth search results 314 in comparison to the primary search results 310.1. The search results merger 212 may include a link that if selected by the searcher will show the fourth search results 316 in a more full form.

The search results merger 212 may then place additional primary search results 310.3 after the second search results 312. In some embodiments there may be at least two entries from the additional primary search results 310.3.

In some embodiments the search results merger 212 may place additional secondary search results after the primary search results 310.4 and may include additional portions of the primary search results 310.

The click analyser 214 may record and analyse any clicks the searcher selects from the federated search page 308. For example, the click analyser 214 may store click results in the historical search data 252.2 based on the features extracted by the feature extractor 208. In some embodiments the click analyser 214 may determine the following metrics abandonment, CTR@P1, normalized page views, actions and clusters, and number of searches. The query tagger 202, intent determiner 203, resource selector and submitter 204, feature extractor 208, search results ranker 210, search results merger 212, and click analyser may all improve their performance on the next search query 302 based on the click analyser 214 analysing the clicks of the searcher on the generated federated search results page 308.

The federated search engine 112 may include a sender (not illustrated) that is configured to cause the federated search results page 308 to be displayed to a user. For example, the sender may send the federated search results page 308 to an application server module 110 or user interface module 108 that causes the federated search results page 308 to be sent to a web browser of the user.

Figure 4:
FIG. 4 illustrates an example of a federated search results page in accordance with some embodiments.

FIG. 4 illustrates an example of a federated search results page 400 in accordance with some embodiments. Illustrated in FIG. 4 are primary search results 402, second search results 404, third search results 406, and action 408.

The federated search results page 400 is in response to a search query 302 of "leadership." The information source 122 selected for the primary search results 402 is people 250.1. The primary search results 402 are placed in a first portion 402.1, second portion 402.2, and a third portion 402.3. Interleaved with the primary search results 402 are second search results 404, and third search results 406. The second search results 404 and the third search results 406 may be termed clusters.

In some embodiments one or more actions 408 may be interleaved with the primary search results 402. For example, a filter action 408 is provides the searcher the opportunity to filter the results based on the relationship the searcher has with the primary search results 122 within the social graph data 118.

In some embodiments the primary search results 402 include a header with a number of search results 412 and an indication of the search query 302. In some embodiments the searcher is provided the option to view the results in a specialized application. For example, in FIG. 4, the searcher is provided the option of seeing the search results for information source 122 in a recruiter application (not illustrated).

The first position 402.1 of the primary search results 402 includes a number of search results 415. In some embodiments the number of search results 415 is three. The search results 415 may include the search query 302 bolded 414 and one or more actions 416. The first portion 402.1 of the primary search results 402 may include one or more actions 416 that the searcher may take. For example, the searcher may select connect 416 to try to connect with Abha Singhvi.

Following the first portion 402.1 of the primary search results 402 is the second search results 404. The second search results 404 includes a header 418 and a number of search results 419. The header 418 may include the information source 122 of the second search results 404. Here the information source 122 of the second search results 404 is jobs 250.2. The header 418 may include the number of search result for the second search results 404, which is 338,286. The header 418 may also include an indication of the search query 302, which here is leadership.

The federated search results page 400 may then include a second portion 402.2 of the primary search results 402.1. The second portion 402.2 of the primary search results 402.1 may be the same or similar to the first portion 402.1 of the primary search results 402.1. The second portion 402.2 does not include a header in accordance with some embodiments.

The federated search results page 400 may then include third search results 406 which may be present in a same or similar manner as the second search results 404. As illustrated, the information source 122 for the third search results 406 is groups.

The federated search results page 400 may then include a third portion 402.3 of the primary search results 402. The third portion 402.3 of the primary search results 402 may be presented in a same or similar manner as the second portion 402.3 of the primary search results 402.2. The federated search results page 400 may include a fourth search results 316 after the third portion 402.3 of the primary search results 402 in accordance with some embodiments.

Figure 5:
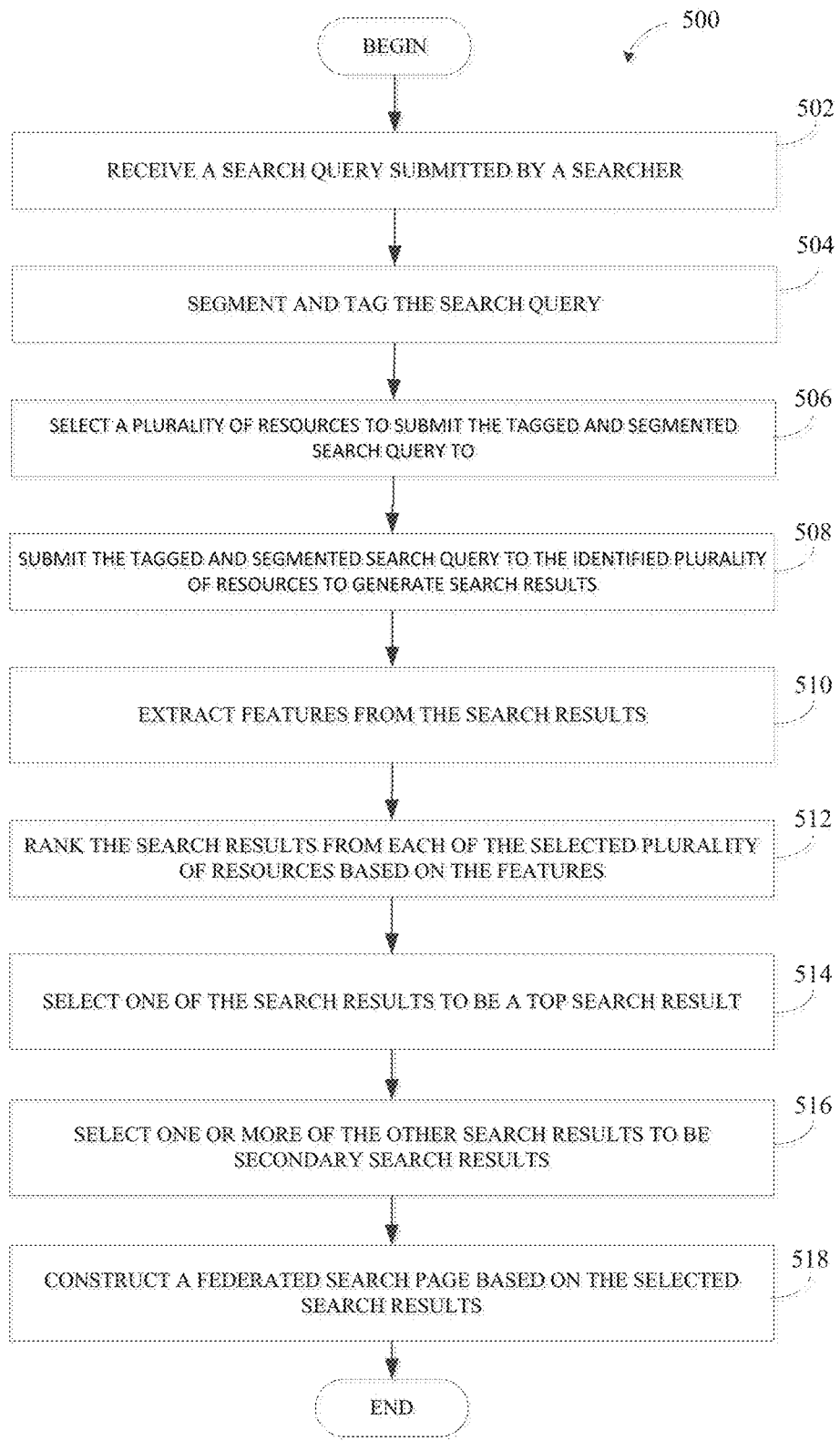
FIG. 5 illustrates a method for federated search page construction based on machine learning in accordance with some embodiments.

FIG. 5 illustrates a method 500 for federated search page construction based on machine learning in accordance with some embodiments. The method 500 begins at operation 502 with receive a search query submitted by a searcher. For example, a user of LinkedIn® may type in a search query 302. The method 500 continues at operation 504 with segment and tag the search query. For example the search query 302 may be segmented and tagged by query tagger 202 to generate the tagged query 304.

The method 500 continues at operation 506 with select a plurality of resources to submit the tagged and segmented search query to. For example, resource selector and submitter 204 may submit the tagged query 304 to one or more of the information sources 122. In some embodiments the tagged query 304 is submitted to all the information sources 122.

The method 500 continues at operation 508 with submit the tagged and segmented search query to the identified plurality of resources to generate search results. For example, the resource selector and submitter 204 may submit the tagged query 304 to the selected information resources 122.

The method 500 continues at operation 510 with extract features from the search results. For example, feature extractor 208 may extract features from the search results 308.

The method 500 continues at operation 512 with rank the search results from each of the selected plurality of resources based on the features. For example, the search results ranker 210 may rank the search results 308 to generate the search ranking 309.

The method 500 continues at operation 514 with select one of the search results to be a top or prime search result.

For example, the search results ranker 210 may select primary search results 310 as the top or prime search result.

The method 500 continues at operation 516 with select one or more of the other search results to be second search results. For example the search results ranker 210 may select one or more search results to be the secondary search results 312.

The method 500 continues at operation 518 with construct a federated page based on the selected search results. For example, search results merger 212 may construct the federated search results page 308 or 400.

In some embodiments the method 500 may continue with causing the federated search page to be displayed to the searcher. For example, the federated search engine 112 may be configured to send the federated search page 308 to a front end 102 for display and interaction with the searcher. In some embodiments the federated search page 308 is hyper-text mark-up language (HTML).

In some embodiments the method 500 may continue with analyzing a click behavior of the searcher for the federated search page. For example, the click analyser 214 may monitor the searcher and determine which, if any, search result the searcher clicks on. The click analyser 214 may then store this result in the historical search data 252.2. In some embodiments the click analyser 214 may store the click data associated with the extracted features. The method 500 may end.

In some embodiments the method 500 may begin with determining whether to perform a federated search or a non-federated search. A determination may be made whether or not to perform a federated search. For example, it may be determined that a particular information source 122 so highly likely to satisfy the searcher so that a federated search may produce extraneous information that the searcher may not want to be presented to the searcher.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 6:
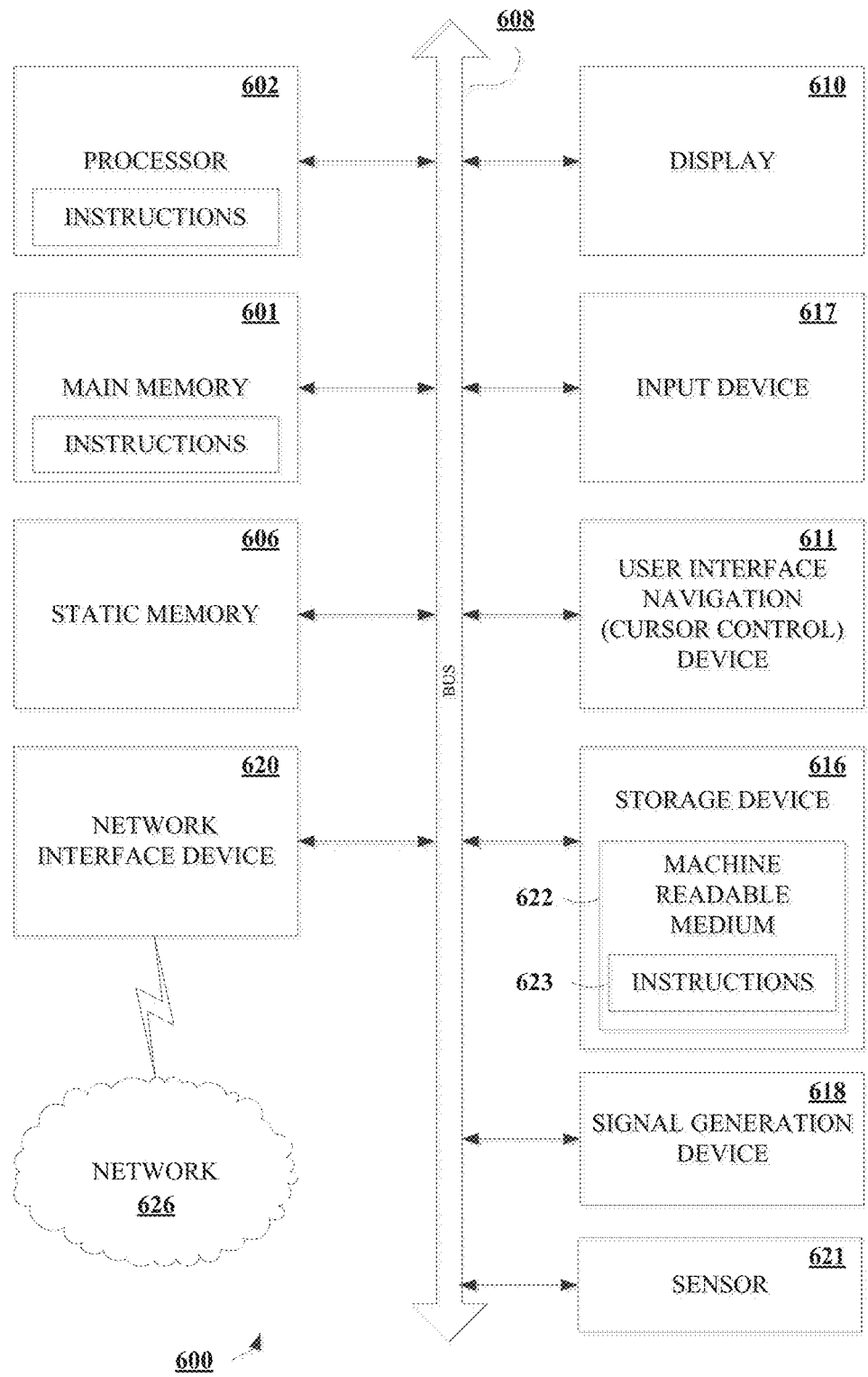
FIG. 6 is a block diagram of a machine in the form of a computing device within which a set of instructions, for causing the machine to perform any one or more of the methodologies discussed herein, may be executed.

FIG. 6 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 601 and a static memory 606, which communicate with each other via a bus 608. The computer system 600 may further include a display unit 610, an alphanumeric input device 617 (e.g., a keyboard), and a user interface (UI) navigation device 611 (e.g., a mouse). In one embodiment, the display, input device and cursor control device are a touch screen display. The computer system 600 may additionally include a storage device 616 (e.g., drive unit), a signal generation device 618 (e.g., a speaker), a network interface device 620, and one or more sensors 621, such as a global positioning system sensor, compass, accelerometer, or other sensor.

The drive unit 616 includes a machine-readable medium 622 on which is stored one or more sets of instructions and data structures (e.g., software 623) embodying or utilized by any one or more of the methodologies or functions described herein. The software 623 may also reside, completely or at least partially, within the main memory 601 and/or within the processor 602 during execution thereof by the computer system 600, the main memory 601 and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 623 may further be transmitted or received over a communications network 626 using a transmission medium via the network interface device 620 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

The following example pertains to further embodiments. In Example 1 a system is disclosed. The system includes one or more modules implemented by one or more processors, the one or more modules configured to: receive a search query submitted by a searcher; submit the search query to a plurality of sources of information to generate a plurality of search results; rank the plurality of search results based on historical search data; select a primary search result and a secondary search result of the plurality of search results based on the ranking; construct a federated search results page with a first portion of the first search results positioned first, a cluster of the second search result positioned second, and a second portion of the first search results positioned third; and cause the federated search results page to be displayed to the searcher.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:
1. A method of searching, the method comprising:
receiving a search query submitted by a searcher;
tagging the search query with one or more fields to generate a tagged search query, wherein the one or more fields are fields associated with a plurality of sources of information;
determining an intent of the searcher based on the tagged search query;
determining a plurality of sources of information based on at least one from the following group: the tagged search query and the intent of the searcher;
submitting the tagged search query to a plurality of sources of information to generate a plurality of search results;
ranking the plurality of search results based on historical search data, wherein the historical search data is based on a number of clicks on search results generated from search queries similar to the search query and the intent of the searcher divided by a number of displays of the search results;

selecting a primary search results and a second search results of the plurality of search results based on the ranking;

constructing a federated search results page with a first portion of the primary search results positioned first, a cluster of the second search results positioned second, a second portion of the first search results positioned third, a cluster of a third search results positioned fourth, a third portion of the primary search results positioned fifth, and wherein the cluster of the second search results is at least two abbreviated search results of the second search results and a header with a name of the corresponding source of information for the second search results, and the cluster of the third search results is at least two abbreviated search results of the third search results and a header with a name of the corresponding source of information for the third search results; and causing the federated search results page to be displayed to the searcher.

2. The method of claim 1, wherein constructing the federated search results page further comprises:

constructing the federated search results page with a cluster of a fourth search results positioned sixth, and a fourth portion of the first primary results positioned seventh.

3. The method of claim 2, wherein constructing the federated search results page further comprises:

constructing the federated search results page with a fifth portion of the primary results positioned eighth, a cluster of a fifth search results positioned ninth, and a sixth portion of the primary results positioned tenth.

4. The method of claim 1, further comprising:

extracting one or more features from the plurality of search results, and wherein ranking further comprises:

ranking the plurality of search results based on the historical search data and the extracted features.

5. The method of claim 4, wherein each feature of the one or more features is one from the following group: an intent of the searcher feature, a results relevance, a primary results feature, and a secondary results feature.

6. The method of claim 1, further comprising:

analyzing a click behavior of the searcher for the federated search page.

7. The method of claim 6, wherein analyzing the click behavior further comprises:

storing the analyzed click behavior in the historical search data.

8. The method of claim 1, wherein the intent of the searcher is a job seeker intent or a recruiter intent.

9. The method of claim 1, wherein each of the one or more fields is one from the following group: a first name, a company name, and a job title.

10. A system comprising:

one or more computer processors, the one or more computer processors configured to:

receive a search query submitted by a searcher;

tag the search query with one or more fields to generate a tagged search query, wherein the one or more fields are fields associated with a plurality of sources of information;

determine an intent of the searcher based on the tagged search query;

determine a plurality of sources of information based on at least one from the following group: the tagged search query and the intent of the searcher submit the tagged search query to a plurality of sources of information to generate a plurality of search results;

rank the plurality of search results based on historical search data, wherein the historical search data is based on a number of clicks on search results generated from search queries similar to the search query and the intent of the searcher divided by a number of displays of the search results;

select a primary search result and a secondary search result of the plurality of search results based on the ranking;

construct a federated search results page with a first portion of the first search results positioned first, a cluster of the second search result positioned second, a second portion of the first search results positioned third, a cluster of a third search results positioned fourth, a third portion of the primary search results positioned fifth, and wherein the cluster of the second search results is at least two abbreviated search results of the second search results and a header with a name of the corresponding source of information for the second search results, and the cluster of the third search results is at least two abbreviated search results of the third search results and a header with a name of the corresponding source of information for the third search results; and cause the federated search results page to be displayed to the searcher.

11. The system of claim 10, further comprising:

one or more modules implemented by the one or more computer processors, the one or more modules comprising:

a receiver module configured to receive a search query submitted by a searcher;

a submitter module configured to submit the tagged search query to a plurality of sources of information to generate a plurality of search results;

a search results ranker module configured to rank the plurality of search results based on historical search data, and to select a primary search result and a secondary search result of the plurality of search results based on the ranking;

a search results merger module configured to construct a federated search results page with the first portion of the first search results positioned first, the cluster of the second search result positioned second, the second portion of the first search results positioned third, the cluster of the third search results positioned fourth, the third portion of the primary search results positioned fifth, and wherein the cluster of the second search results is at least two abbreviated search results of the second search results and the header with the name of the corresponding source of information for the second search results, and the cluster of the third search results is at least two abbreviated search results of the third search results and the header with a name of the corresponding source of information for the third search results; and sender module configured to cause the federated search results page to be displayed to the searcher.

12. The system of 10, wherein the one or more computer processors are further configured to:

extract one or more features from the plurality of search results, and wherein rank further comprises:

rank the plurality of search results based on historical search data and the extracted features.

13. The system of claim 12, wherein each feature of the one or more features is one from the following group: an intent of the searcher feature, a results relevance, a primary results feature, and a secondary results feature.

14. A non-transitory computer-readable storage medium storing instructions thereon, which, when executed by one or more computer processors, cause the one or more computer processors to perform operations, the operations comprising:
receiving a search query submitted by a searcher;
tagging the search query with one or more fields to generate a tagged search query, wherein the one or more fields are fields associated with a plurality of sources of information;
determining an intent of the searcher based on the tagged search query;
determining a plurality of sources of information based on at least one from the following group: the tagged search query and the intent of the searcher;
submitting the tagged search query to a plurality of sources of information to generate a plurality of search results;
ranking the plurality of search results based on historical search data, wherein the historical search data is based on a number of clicks on search results generated from search queries similar to the search query and the intent of the searcher divided by a number of displays of the search results;
selecting a primary search result and a secondary search result of the plurality of search results based on the ranking;
constructing a federated search results page with a first portion of the first search results positioned first, a cluster of the second search result positioned second, a second portion of the first search results positioned third, a cluster of a third search results positioned fourth, a third portion of the primary search results positioned fifth, and wherein the cluster of the second search results is at least two abbreviated search results of the second search results and a header with a name of the corresponding source of information for the second search results, and the cluster of the third search results is at least two abbreviated search results of the third search results and a header with a name of the corresponding source of information for the third search results; and
causing the federated search results page to be displayed to the searcher.

15. The method of claim 1, wherein search results of the first portion of the primary search results are ranked higher than search results of the second portion of the primary results, and search results of the second portion of the primary results are ranked higher than search results of the third portion of the primary results.

* * * * *

UNITED STATES PATENT AND TRADEMARK OFFICE
CERTIFICATE OF CORRECTION

PATENT NO. : 9,946,799 B2
APPLICATION NO. : 14/753742
DATED : April 17, 2018
INVENTOR(S) : Arya et al.

Page 1 of 1

It is certified that error appears in the above-identified patent and that said Letters Patent is hereby corrected as shown below:

On the Title Page

On page 2, in Column 1, under "Other Publications", Line 3, delete "Heterogenous" and insert --Heterogeneous-- therefor In the Claims In Column 16, Line 3, in Claim 10, after "searcher", insert --;--

In Column 17, Line 18, in Claim 14, after "group:", insert --¶--

Signed and Sealed this
Fourth Day of June, 2019

Andrei Iancu
*Director of the United States Patent and Trademark Office*